March 9, 1971 — P. P. COPPOLA — 3,568,410
HYDROGEN PUMPING APPARATUS
Filed Feb. 13, 1969
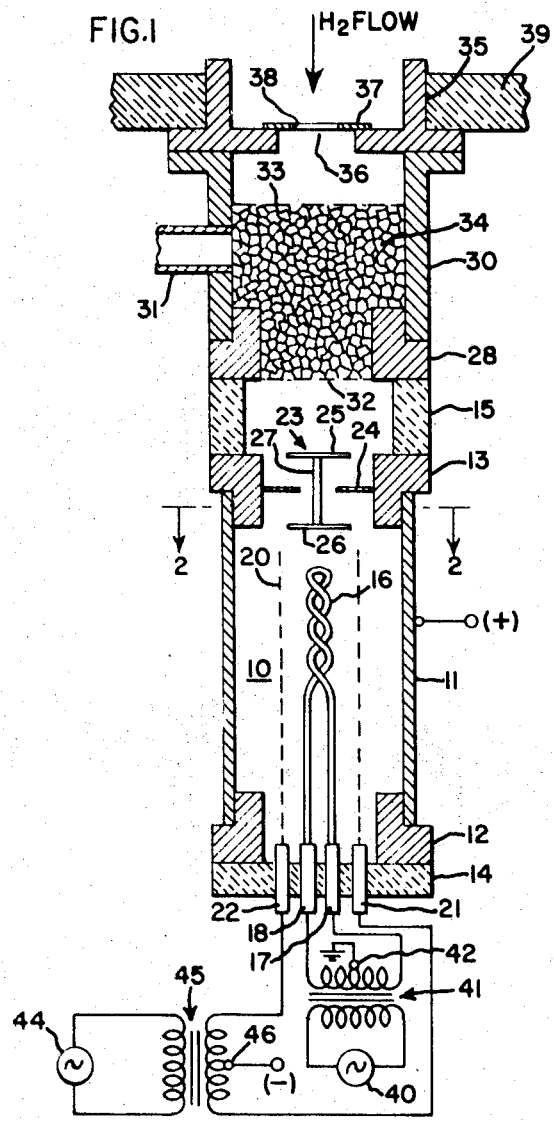
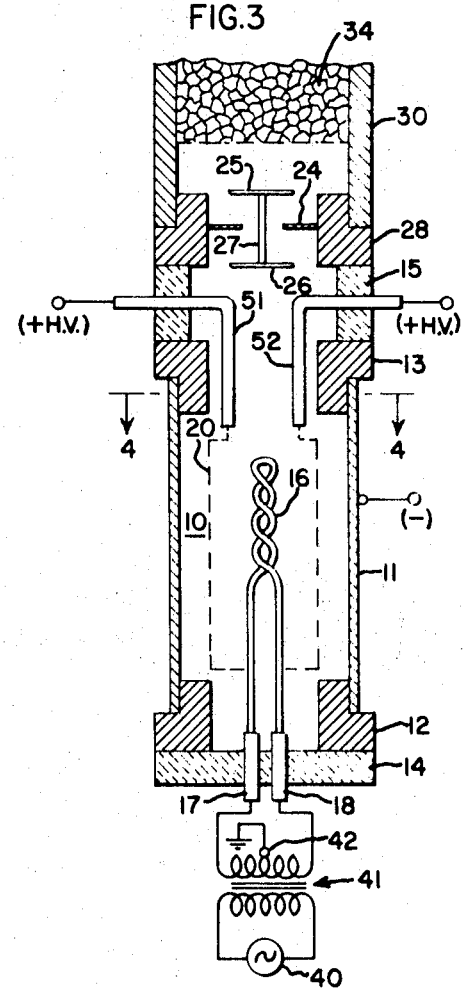
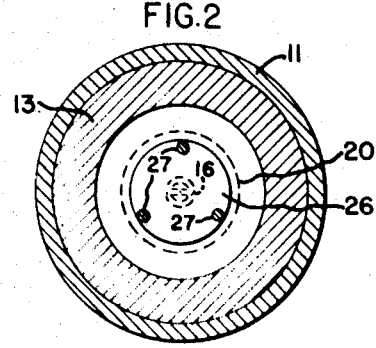
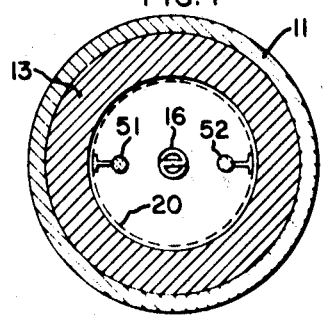
INVENTOR:
PATRICK P. COPPOLA,
BY Marvin Snyder
HIS ATTORNEY.

United States Patent Office 3,568,410
Patented Mar. 9, 1971

3,568,410
HYDROGEN PUMPING APPARATUS
Patrick P. Coppola, Fayetteville, N.Y., assignor to
General Electric Company
Filed Feb. 13, 1969, Ser. No. 799,021
Int. Cl. B01d 53/22
U.S. Cl. 55—158
16 Claims

ABSTRACT OF THE DISCLOSURE

A gas pump of simplified, sturdy construction employs palladium maintained at an elevated temperature to permit efficient evacuation of gas from a region of low pressure to a region where partial pressure of the gas is several orders of magnitude higher. The cylindrical shape of the pump provides increased mechanical strength and improved maintenance of dimensional characteristics, resulting in uniform heating of the pump walls and consequential high ionization efficiency. Titanium rings at either end of the palladium further improve pump efficiency.

INTRODUCTION

This invention relates to pumps for gaseous substances, and more particularly to improved pumps comprised of palladium for rapidly removing hydrogen from a region of low pressure to a region of higher partial pressure of hydrogen.

Hydrogen permeable diaphragms, such as diaphragms of palladium and alloys thereof, have heretofore been employed for the transfer of hydrogen therethrough by diffusion to a region of lower hydrogen pressure from a region of higher partial pressure of hydrogen. More recently, diaphragms comprised of palladium have also been employed for transfer of hydrogen therethrough from a region of low pressure to a region of higher partial pressure of hydrogen. Diaphragms of the latter type, which are maintained at an elevated temperature during pumping, are described and claimed in V. L. Stout et al. Pat. 3,214,359, issued Oct. 26, 1965, and assigned to the instant assignee. In pumps of the latter type, hydrogen moves from the interior of a vacuum tube device, which typically may be an electron beam device of the type employed for projection of television images and utilizing a light modulating medium which gives off hydrogen or hydrogen-containing vapors during operation, to the atmosphere. The process by which hydrogen passes through the diaphragm is believed to involve permeation and/or diffusion either through grain boundaries or through crystal lattice deformations occurring upon application of heat. This hydrogen pumping is apparently made possible through a catalytic reaction of the evolved hydrogen with oxide on the external surface of the palladium diaphragm, resulting in formation of water. The water, in turn, is evaporated from the hot surface. The oxygen partial pressure of the atmosphere maintains a state of palladium oxidation to continue promoting the reaction of hydrogen with oxygen to form water, thereby sustaining hydrogen pumping.

While pumps of this type are satisfactory under most operating conditions, some sagging of the diaphragm under vacuum has been experienced. This can cause difficulty in maintaining uniform spacing between the diaphragm and heated filaments elevating the diaphragm temperature; that is, uniformity of radiation upon the diaphragm may be degraded, and electron heating at any specified power input may be somewhat indeterminate. Moreover, sagging of the diaphragm, when in a heated state, may result in rupture and failure.

The pump of the present invention provides greater efficiency in removing hydrogen, while also improving both performance and reliability. This is accomplished by fabricating the pump of palladium-silver alloy tubing attached to titanium rings at either end. The cylindrical configuration of the palladium-silver alloy has sufficient structural strength to avoid sagging, thus retaining spacing dimensions with respect to interior components such as a heated filament emitter and a screen coil titanium getter. By maintaining the emitter filament substantially at ground potential, the palladium at a positive potential, and the screen coil getter at a negative potential, the resultant electron emission from the filament facilitates ion formation, thereby promoting positive ion collection at the screen coil getter and negative ion collection at the palladium wall. Alternatively, by maintaining the screen coil titanium getter at several thousand volts positive potential, the emitter filament substantially at ground potential, and the palladium at a negative potential, electrons from the hot filament at ground potential are sufficiently accelerated to the screen coil titanium getter to provide additional heating of the titanium and consequently some slight titanium sublimation. Ionization of gas molecules take place in the region between the hot filament and the titanium getter. Some of these ions are gettered by the titanium sublimation, and the remainder of the ions are attracted to the hot palladium. Thus, enhanced pumping of hydrogen and other gases can be achieved considerably in excess of pumping due solely to palladium heating.

Accordingly, one object of the invention is to provide improved apparatus for pumping hydrogen from a region of low partial pressure of hydrogen to a region of higher partial pressure of hydrogen.

Another object is to provide a highly reliable palladium pump having a structure which retains its dimensional characteristics irrespective of temperature and pressure changes.

Another object is to provide a palladium pump of high ionization efficiency and pumping speed.

Briefly, in accordance with a preferred embodiment of the invention, apparatus for removing hydrogen from a region to be maintained at low hydrogen pressure to a region of higher hydrogen pressure comprises a substantially cylindrical hollow chamber formed by a curved wall comprised of palladium. The interior of the chamber is in gaseous communication with the region to be maintained at low hydrogen pressure. Heating means are situated within the chamber in a substantially coaxial location therewith so as to uniformly heat the interior surface of the curved wall. First and second annular rings comprising titanium are affixed to the curved wall at either end of the chamber to form seals with the wall.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a cross-sectional view of one embodiment of the invention;

FIG. 2 is a sectional view taken along line 2—2 in the embodiment of FIG. 1, shown as a full section;

FIG. 3 is a cross-sectional view of a second embodiment of the invention; and

FIG. 4 is a sectional view taken along line 4—4 of the embodiment shown in FIG. 3, shown as a full section.

DESCRIPTION OF TYPICAL EMBODIMENTS

In FIG. 1, a substantially cylindrical hollow chamber 10 is formed by a curved wall 11 comprised of palladium which is conveniently alloyed with silver. A typical useful alloy comprises 75% palladium and 25% silver, the silver serving to enhance the structural rigidity of the palladium. Wall 11 is attached to annular titanium rings 12 and 13 at either end thereof, as by welding. Titanium ring 12 is brazed to a ceramic stem 14, while titanium ring 13 is brazed to an open ceramic ring 15. A typical ceramic material comprises Forsterite, a magnesium silicate of the composition $2MgO-SiO_2$.

Situated coaxially within chamber 11 is a refractory metal emitter filament 16 comprising, for example, tungsten, rhenium, tungsten-rhenium alloys, indium-thorium alloys, thoriated tungsten, etc., or any other material which provides sufficient radiant energy to heat the palladium diaphragm to a temperature in the range of 300° C.–500°C. and produce some electron emission for hydrocarbon cracking and/or ion pumping. Filament 16, which is resistance heated, may be mounted on stem leads 17 and 18. A screen coil 20 is mounted on a pair of stem leads 21 and 22 to facilitate resistance heating for the coil, which is maintained at a potential below ground. Screen coil 20 is further heated by radiation from emitter filament 16 to a temperature in the range of 1000°C.–1100° C. for pumping of gases and for hydrocarbon cracking.

A radiation shield 23 is situated within the general region enclosed by titanium ring 13. This heat shield comprises an apertured plate 24 affixed to titanium ring 13 as by spot welding, plus an upper disc 25 and a lower disc 26. Plate 24 and discs 25 and 26 are typically comprised of titanium. Discs 25 and 26 are supported in relation to apertured disc 24 by several struts 27, one of which is illustrated in the embodiment of FIG. 1.

An additional titanium ring 28 is brazed to ceramic disc 15, and Kovar tubing 30 is vacuum brazed to titanium ring 28. Kovar tubing 30 contains a tubulation 31 therein to permit gaseous evacuation of the pump prior to pump operation. Tubulation 31, which may comprise Kovar or titanium, is sealed closed, as by crimping, after the pump has been evacuated.

A screen 32 is welded to titanium ring 28, and an additional screen 33 is welded to Kovar ring 30. A charge of organic gas sorbing material 34 is maintained between screens 32 and 33 for the purpose of further removing undesired organic gases from the pump. Material 34 may comprise one or more of the zeolites, activated alumina, activated charcoal or the like, as described and claimed in P. P. Coppola Pat. 3,221,197, issued Nov. 30, 1965 and assigned to the instant assignee.

A Kovar collar 35 having an opening 36 therein, is welded to Kovar cylinder 30. A disc 37 of Kovar or tantalum is welded to collar 35 around the perimeter of opening 36. Disc 37 has a passageway 38 therein which is opened only after the entire pump has been evacuated of gas; that is, disc 37 maintains a tight seal around opening 36 until the pump has been attached to the device to be evacuated. This attachment is made to a wall 39 of the device to be evacuated, typically comprised of glass, by fritting collar 35 thereto. After this attachment has been made, disc 37 is opened, as by employment of a laser beam, permitting the pump to communicate with the region from which gases are to be evacuated.

FIG. 2 is a sectional view taken along line 2—2 of FIG. 1, showing the location of cylinder 11 relative to titanium ring 13 and radiant heat shield 26. The relative positions of struts 27, which support portions 25 and 26 of radiant heat shield structure 23, are also illustrated.

Filament 16 is heated by A-C voltage from a source 40 supplied through a transformer 41. The center tap 42 of the secondary winding of transformer 41 is grounded. Similarly, getter screen coil 20 is resistance heated from an A-C source 44 through a transformer 45, the center tap 46 of the secondary winding thereof being connected to a source of negative potential. Palladium cylinder 11 is maintained at a positive potential with respect to ground. Screen coil 20 typically comprises titanium, although hafnium, zirconium, or alloys thereof may be employed in the alternative.

In operation, collar 35 is fitted to the region to be evacuated of hydrogen. Flow of hydrogen gas occurs in the direction indicated by the arrow. This gas passes through gas sorbing material 34 into the region enclosed by ceramic ring 35. However, some of the hydrogen molecules are gettered by titanium ring 28, since this ring is in a relatively cool condition due to its isolation from the region enclosed by palladium cylinder 11 by heat insulation means such as ceramic ring 15. In addition, radiant heat shield means 23 also serve to confine heat emanating from filament 16 and screen coil 20, to the region of chamber 10. Although titanium ring 13, being closer to filament 16 and screen coil 20 than titanium ring 28, is at a higher temperature than ring 28, some additional hydrogen molecules are nevertheless gettered by titanium ring 13. However, titanium ring 28 is more efficient in gettering hydrogen molecules due to the fact that titanium is a more efficient getter material for hydrogen at lower temperatures. Molecules of other gases which may be present, such as nitrogen, oxygen, etc., are gettered by the heated screen coil. It should also be noted that organic gas sorbing material 34 serves to entrap considerable quantities of hydrocarbon vapors emitted by oils undergoing electron bombardment within the envelope of the electron beam device employed for projecting television images. Material 34 consequently eases the functional requirements of the palladium pump, as will become more apparent, infra.

After the hydrogen molecules have passed into chamber 10, they are heated due to their proximity to filament 16 and screen coil 20. This is because filament 16 is resistance heated to a sufficiently high temperature to raise the temperature of palladium wall 11 above 300° C., and additional radiant heat, together with electron bombardment from the filament, achieve a palladium temperature of 500° C. or slightly higher. Wall 11, moreover, is uniformly heated since filament 16 is substantially equidistant therefrom. Screen coil 20, being situated between emitter filament 16 and palladium wall 11, may be resistance heated, electron heated, or both, to achieve temperatures ranging from 1000° C.–1100° C. for pumping of gases and for hydrocarbon cracking. Cracking of the hydrocarbon vapors produces hydrogen molecules and carbon molecules within chamber 10. The carbon molecules can collect on the inside of wall 11 and on the hot filaments, while the hydrogen molecules pass through wall 11 and react with the oxide on the external surface of wall 11 to form water. The water, in turn, is evaporated from the hot outer surface of palladium wall 11. The presence of oxygen in the atmosphere maintains a palladium oxide on the outer surface of wall 11 which permits continuation of the hydrogen-to-water cycle and sustains hydrogen pumping. In this fashion, hydrogen molecules are removed from the interior of the device to be maintained in a condition substantially depleted of hydrogen molecules.

The pumping operation is further enhanced by adjustment of electrical potentials on the pump components so as to produce ion pumping. For example, with the emitter filament maintained close to ground potential, positive voltage on the palladium, and negative voltage on screen coil 20, ions are formed within chamber 10 by bombardment of gas molecules with electrons emitted from filament 16. This ion formation is followed by ion collection. Specifically, negative ions which migrate outside the region enclosed by screen coil 20 are accelerated to palladium wall 11 by the potential gradient between screen coil 20 and wall 11. Similarly, positive ions are collected at screen coil 20 and, since screen coil 20 is comprised of titanium, the ions collected at coil 20 are gettered.

In the event the hydrogen pumping apparatus of the present invention is employed in apparatus which does not require it to be hermetically sealed for cleanliness and/or storage prior to its attachment to the device to be evacuated, tubulation 31 is omitted and Kovar tubing 30 is continuous. In addition, disc 37 is omitted, leaving the interior of the pump in communication with the interior of the device to be evacuated once the pump has been attached thereto. Evacuation of the pumping apparatus is then accomplished concurrently with evacuation of the device to be maintained at minimal hydrogen pressure, and operation of the pumping apparatus is the same as already described.

FIG. 3 is a second embodiment of the pump of the instant invention, wherein like numerals indicate like components. In this embodiment, screen coil 20 is maintained at a high positive potential, as indicated by the designation (+H.V.) applied to leads 51 and 52. Resistance heating of screen coil 20 may conveniently be done away with in this embodiment, since electrons emitted from heated filament 16 at close to ground potential are accelerated by screen coil 20, which is maintained at several thousand volts potential. This causes sufficient heating of titanium screen coil 20 to result in some slight titanium sublimation. The molecules of gas within chamber 10, moreover, are ionized by the high energy electrons, and some of the ions thus formed are gettered by the titanium sublimation. The remainder of the ions are attracted to hot palladium wall 11, which is maintained at a negative potential with respect to ground. Again, therefore, ionization of the gas molecules enhances pumping of hydrogen and other gases, facilitating achievement of a pumping rate considerably in excess of the rate which may be achieved by heated palladium alone.

FIG. 4 is a section of the pump as viewed along line 4—4 of FIG. 3, wherein like numerals indicate like components. The illustration of FIG. 4 shows relative location of leads 51 and 52 with respect to screen coil 20 and filament 16.

The foregoing describes improved apparatus for pumping hydrogen from a region of low partial pressure of hydrogen to the atmosphere, which comprises a higher partial pressure of hydrogen. The apparatus comprises a highly reliable palladium pump which maintains its structural dimensions irrespective of temperature and pressure changes. The pump exhibits high pumping speed and high ionization efficiency, as well as symmetrical configuration which promotes uniform potential gradients and uniform heating therein. The pump is simple in configuration, thereby facilitating ease in fabrication. By employment of appropriate heat isolation techniques, temperature of the palladium pump wall is maintained substantially uniform over its entire length, so that the side of the palladium wall exposed to the atmosphere becomes uniformly oxidized due to this heating.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What I claim is new and desire to secure by Letters Patent of the United States is:

1. Apparatus for removing hydrogen from a region to be maintained at low hydrogen pressure to a region of higher hydrogen pressure comprising: a substantially cylindrical hollow chamber formed by a curved wall comprised of palladium, the interior of said chamber being in gaseous communication with said region to be maintained at low hydrogen pressure; heating means situated within said chamber in a substantially coaxial location therewith so as to uniformly heat the interior surface of said curved wall; and first and second annular rings affixed to said curved wall at each end of said chamber to form seals with said wall, said rings comprising titanium.

2. The apparatus of claim 1 wherein the outer surface of said curved wall is maintained in an oxidized condition.

3. The apparatus of claim 1 including an additional annular ring comprising titanium, and heat isolation means sealably coupling said second annular ring to said additional annular ring.

4. The apparatus of claim 2 including an additional annular ring comprising titanium, and heat isolation means sealably coupling said second annular ring to said additional annular ring.

5. The apparatus of claim 3 including a heat radiation shield positioned between said region to be maintained at low hydrogen pressure and said substantially cylindrical hollow chamber.

6. The apparatus of claim 1 wherein said heating means comprises an emitter filament and a getter screen coil situated between said emitter filament and the interior surface of said curved wall.

7. The apparatus of claim 2 wherein said heating means comprises an emitter filament and a getter screen coil situated between said emitter filament and the interior surface of said curved wall.

8. The apparatus of claim 6 wherein said getter screen coil is maintained at a potential of one polarity with respect to said filament and said palladium is maintained at a potential of opposite polarity with respect to said filament.

9. The apparatus of claim 6 including means coupled to said getter screen coil for resistively heating said coil.

10. The apparatus of claim 7 wherein said getter screen coil is maintained at a potential of one polarity with respect to said filament and said palladium is maintained at a potential of opposite polarity with respect to said filament.

11. The apparatus of claim 1 wherein said curved wall consists essentially of palladium and silver.

12. Apparatus for removing hydrogen from a region to be maintained at low hydrogen pressure to a region of higher hydrogen pressure comprising: a hollow chamber formed by a curved wall comprised of palladium, the interior of said chamber being in gaseous communication with said region to be maintained at low hydrogen pressure; heating means situated within said chamber at a location substantially equidistant from said curved wall so as to uniformly heat the interior surface of said curved wall; and first and second annuli affixed to said curved wall at each end of said chamber to form seals with said wall, said annuli comprising titanium.

13. The apparatus of claim 12 wherein the outer surface of said curved wall is maintained in an oxidized condition.

14. The apparatus of claim 12 wherein said heating means comprises an emitter filament and a getter screen coil situated between said emitter filament and the interior surface of said curved wall.

15. The apparatus of claim 13 wherein said heating means comprises an emitter filament and a getter screen coil situated between said emitter filament and the interior surface of said curved wall.

16. The apparatus of claim 12 wherein said curved wall consists essentially of palladium and silver.

References Cited

UNITED STATES PATENTS

| | | | |
|---|---|---|---|
| 1,174,631 | 3/1916 | Snelling | 55—158 |
| 3,092,517 | 6/1963 | Oswin | 55—160X |
| 2,984,314 | 5/1961 | Denton | 55—267X |
| 2,986,641 | 5/1961 | Michels | 55—158X |
| 3,132,014 | 5/1964 | Wildvana et al. | 55—158 |
| 3,214,359 | 10/1965 | Stout et al. | 55—16X |

JOHN ADEE, Primary Examiner

U.S. Cl. X.R.

55—267